United States Patent [19]

Stevens

[11] 3,815,539

[45] June 11, 1974

[54] SINGLE HULL TUG AND BARGE CONSTRUCTION

[75] Inventor: John N. Stevens, West Palm Beach, Fla.

[73] Assignee: Catug Corporation, Fort Lauderdale, Fla.

[22] Filed: Oct. 16, 1972

[21] Appl. No.: 297,804

[52] U.S. Cl. .......................................... 114/235 R
[51] Int. Cl. ............................................ B63b 21/00
[58] Field of Search .......... 114/235 R, 235 A, 77 R, 114/43.5

[56] References Cited
UNITED STATES PATENTS

| | | | |
|---|---|---|---|
| 2,798,448 | 7/1957 | Hale | 114/235 R |
| 3,345,970 | 10/1967 | DeLong | 114/235 R |
| 3,362,372 | 1/1968 | Peterson | 114/235 R |
| 3,486,476 | 12/1969 | Breit | 114/235 R |
| 3,492,964 | 2/1970 | Garcia | 114/235 R |
| 3,613,628 | 10/1971 | Garcia | 114/235 R |

Primary Examiner—George E. A. Halvosa
Assistant Examiner—Edward R. Kazenske
Attorney, Agent, or Firm—James F. Jones

[57] ABSTRACT

An integrated single hull tug and barge unit capable of operation on the high seas is produced by providing a cargo carrying unit such as, for example, a barge unit, with a recess area in the aft end thereof with the recess area being contoured and dimensioned to receive and support the forward portion of the hull of a tugboat unit in substantially tight interfitted relationship. The tugbot unit has the forward or bow portion of the hull shaped to conform with the curvature of the recess area at the aft end of the cargo carrying unit so that a substantially tight mating engagement therebetween is achieved. The forward end of the recess area of the cargo carrying unit on either side thereof is provided with a recess area forming support members on each side. The forward end of the tugboat unit on each side of the hull is provided with a shoulder member complementary with and supported by the support member of the recess area of the cargo carrying unit. Positively driven sliding wedge units or like wedging means are positioned between the cargo carrying unit and tugboat unit engagements to insure a tight engagement and to eliminate any relative movement between the tugboat and the cargo carrying unit. Further, positively driven connecting add disconnecting means are provided between the forward end of the tugboat unit and the aft end of the cargo carrying unit at the recess area thereof to draw the tugboat and the cargo carrying unit tightly together and thus prevent the tug from moving aft relative to the cargo carrying unit.

5 Claims, 9 Drawing Figures

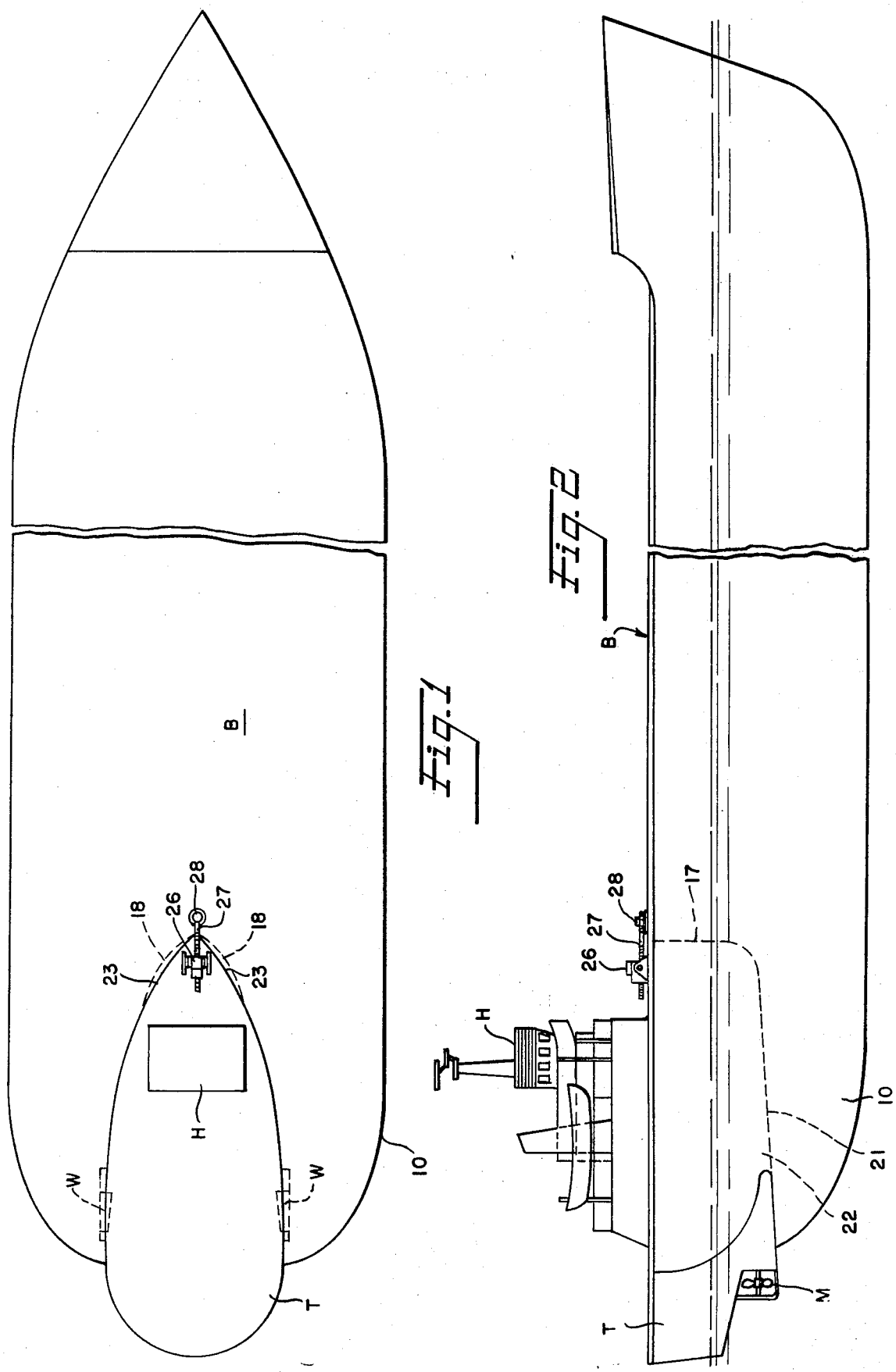

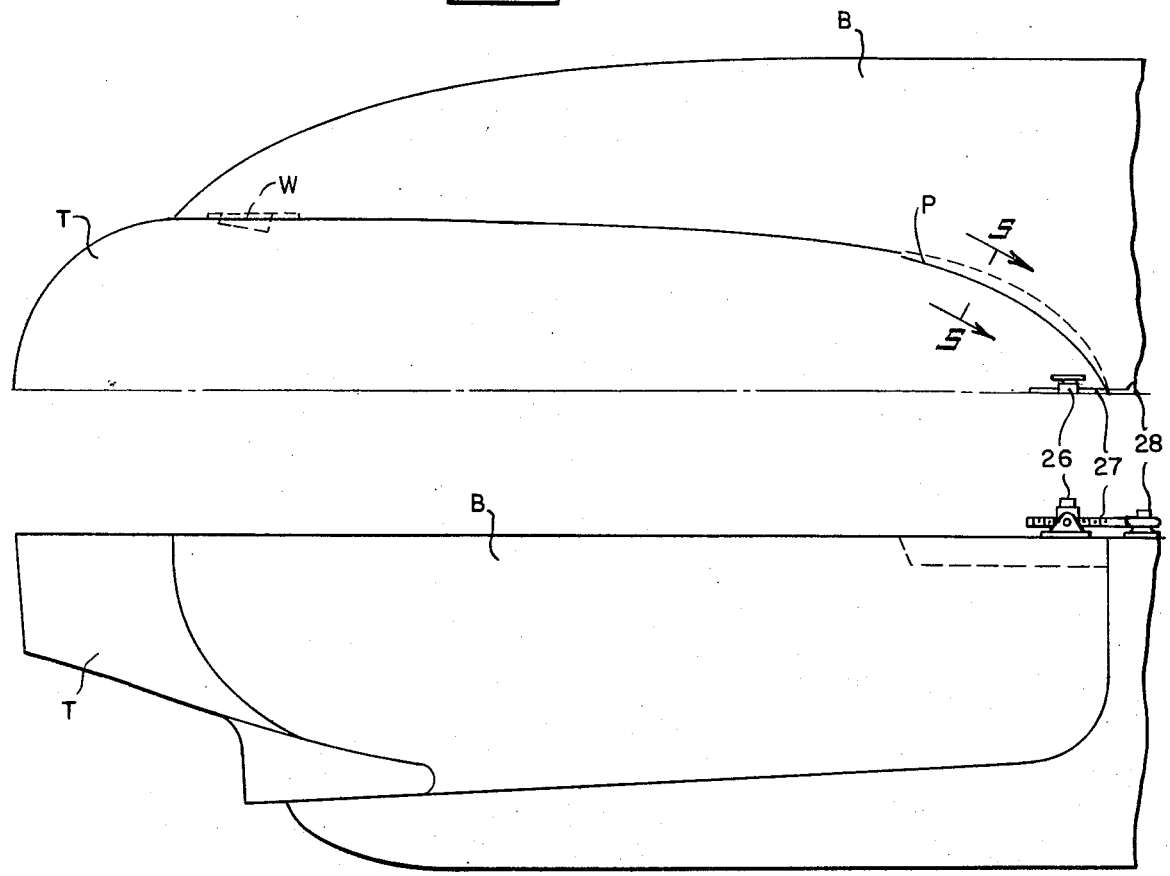
Fig. 3
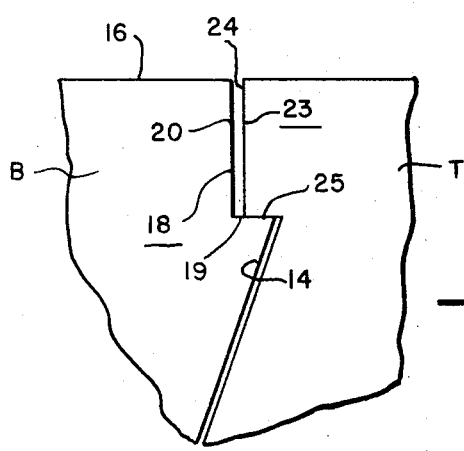
Fig. 4
Fig. 5

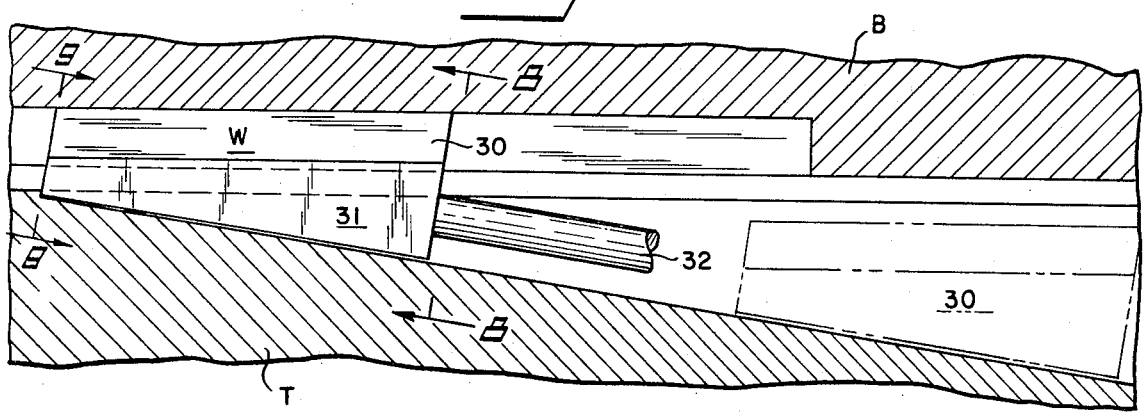
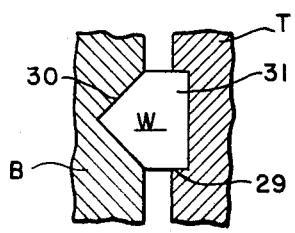 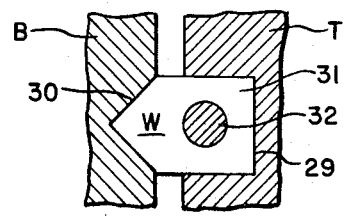
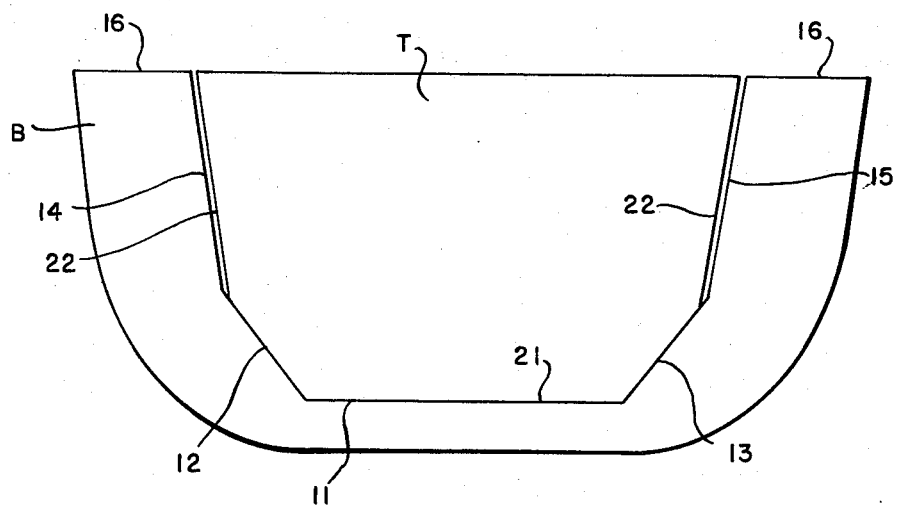

SINGLE HULL TUG AND BARGE CONSTRUCTION

BACKGROUND OF THE INVENTION

A. Field Of The Invention

The general practice in the transportation of cargo by water that has been followed has been to employ a cargo ship that is designed and constructed for the transporting of a particular class of goods, such as, for example, general freight or cargo ships, oil or fuel tankers, colliers, or the like. Such cargo vessels have been characterized as being ships which are self-contained ships which include not only the cargo area but also include their own power and propulsion means, complete quarters for ship personnel, and the like. This mode of cargo shipment has been the sole means utilized from the beginning of shipment and was found to be generally satisfactory.

In recent years, due to the increased cost of ship construction and the labor cost in operating such vessels, this type of a self-contained sea going shipping vessel has become less attractive to ship owners and has presented many problems of an economical nature. By way of example, the cost for the building of a complete, self-contained cargo vessel for the shipment of a particular type of goods, and including all other costs for personnel quarters, propulsion systems and expenditures relating thereto has so materially increased that it represents an initial investment that requires a considerable period of time for the shipper just to recover the initial cost of the vessel alone.

Another factor that has weighed heavily in the development of different shipping means is that cargo ships must be efficient in operation, use, and maintenance. With the prior cargo vessels heretofore employed, such ships have been relatively fast in transporting the goods from one port to another, which is highly desirable. However, such self-contained cargo ships upon reaching a given port will be tied up in port for a considerable period of time while the cargo is being unloaded and new cargo thereafter taken on. During such a prolonged docking period for unloading and loading, the ship's crew is idle unless working at unproductive tasks, such as, for example, painting or doing other housekeeping and maintenance chores on the ship. This docking period is thus one that is not desirable from an economical standpoint.

The present invention is concerned with the elimination of such disadvantages by providing a basic two-part cargo carrying construction possessing all of the advantages of a unitary cargo ship but none of the disadvantages inherent thereon. In accordance with the present invention there will be provided one part or unit which will be a propulsion section on which the operating personnel will live, and a second separable section which will function solely as the cargo carrying section. In essence, the present invention is concerned with a tug and barge assembly in which the barge carrying the cargo will be pushed by the tub from one port to another. The tug will release the barge for unloading and may then connect to a previously loaded barge assembly and then put immediately to see without any material docking period. Such a construction materially reduces the initial construction cost of the cargo carrying assembly. Moreover, such an assembly will insure that ship personnel will be at productive tasks since the need for prolonged docking to permit unloading and loading is eliminated.

B. Description Of The Prior Art

Considerable activity has been devoted in recent years to overcome and eliminate the problems relative to the utilization of ships that are completely self-contained. Such activity has been directed to the development of separable tug and cargo carrying assemblies as the means to solve the disadvantages inherent with the unitary, self-contained cargo vessels heretofore employed. The basic type of cargo carrying units, such as, for example, a barge assembly and separate tug assembly that has been contemplated and employed heretofore has consisted of a cargo carrying or barge unit having a recessed stern portion and a pusher tugboat having a bow portion of a configuration adapted to be received within the recessed stern portion of the tug in detachable relationship therewith. Such a basic connecting assembly between a barge unit and tugboat has been found to possess many disadvantages which have been found to be quite objectionable and have minimized the use of such assemblies. One basic disadvantage is that such construction permitted the barge unit and tugboat to pitch and roll independently of one another. This movement of the two assemblies independent of one another made it quite difficult, and oftentimes impossible, to employ a tug and barge construction at sea during bad weather conditions.

A specific type of a tugboat and barge or cargo assembly that has received some use in the past is the assembly known as the "Carport" system. This particular system is characterized in that a section known as a well section extends for the major part of the length of the barge unit in a fore and aft direction and provides a complete bottom support for the tugboat. This construction allows a design in which the lines of the tugboat match the lines of the barge and the combination of both units forms a relatively even immersed body. The center of gravity of the tugboat will be found to be within the well section of the barge. The surfaces of the barge well and the tugboat hull will have a generally close fit between their mating surfaces and such construction will permit motion of the two hulls only with respect to one another in a fore and aft direction. This movement in a fore and aft direction is resisted in the "Carport" system by utilization of cables, turn-buckles, or the like.

The "Carport" barge and tug system just described possesses certain fundamental characteristics which have been found to be objectionable in general use. For example, due to the supporting of the tugboat in the extremely lengthy barge well, the lines of the barge, particularly the longitudinal vertical contours thereof, have to be kept very low and close to the keel line. As a consequence thereof the lines of the stern part of the tug have to have fairly steep longitudinal vertical sections, which is not a very efficient or desired shape for the after body of the tug from a propulsion point of view. Moreover, the "Carport" system does not meet United States requirements of seaworthiness which require that in a separable barge-tug unit, each unit, when separated, must be independently seaworthy and stable under conditions of use. This failure to meet the Federal requirements as to seaworthiness has therefore limited the use of the "Carport" tug and barge construction.

Other tug and barge assemblies have also been contemplated or proposed in which various means of attachment of the tug and the barge or cargo unit are employed in an effort to provide a firm unitary engagement between the two units in all directions. Representative examples of such prior tug-barge assemblies that have been proposed are shown in U.S. Letters Pat. No. 3,345,970 issued to Louis H. DeLong on Oct. 10, 1967, in U.S. Letters Pat. No. 3,362,372 issued to Earl A. Peterson on Jan. 9, 1968, in U.S. Letters Pat. No. 3,417,721 issued to Arthur W. Vienna on Dec. 24, 1968, in U.S. Letters Pat. No. 3,492,964 issued to Emilio C. Garcia on Feb. 3, 1970, in U.S. Letters Pat. Nos. 3,512,495 and 3,550,550 issued to Edwin H. Fletcher on May 19, 1970, and Dec. 29, 1970, respectively, in U.S. Letters Pat. No. 3,557,742 issued to Reuben M. Gainsby on Jan. 26, 1971, and in U.S. Letters Pat. No. 3,316,628 issued to Emilio C. Garcia on Oct. 19, 1971. These foregoing patents are to be considered only as exemplary of such prior tug-barge assemblies and certainly do not represent all patents that have been granted on separable tug and barge assemblies.

These prior tug and barge assemblies, while solving certain problems, have presented others. For example, certain of these prior sea going tug-barge assemblies do not insure tight engagement between the units in all conditions of use. Moreover, such prior tug and barge assemblies, in many instances, are not easily detachable and are quite complicated in design and construction, and present problems, therefore, of efficient use. Further, many of such prior tug and barge assemblies are so designed and arranged that they are not capable of safely and adequately carrying very large cargoes in all types of weather conditions and the like.

SUMMARY OF THE INVENTION

The present invention eliminates the foregoing and related disadvantages encountered in the manufacture and use of separable tug and barge assemblies contemplated heretofore. In accordance with the present invention, there is provided a tug unit having a single hull and a barge unit provided with a recess at the aft end thereof to receive at least a portion of the forward end of the tug hull therein in supported, tight and yet readily releasable engagement. The recess area of the barge is so contoured as to provide side walls and a bottom portion within which the surface walls of the tug hull will have a mating configuration insuring the sealing of the tug hull in tight and supported engagement therein and will resist forward relative movement therebetween as well as vertical relative movement between the two units. Wedge means of a particular design and operation are also provided for operation in a longitudinal path of movement between the sidewalls of the barge for further locking the two units together in tight engagement. Additional connecting means are also provided for further locking the two units to one another and which will insure that there will be no relative longitudinal movement between the two units. This total assembly just described results in a tug and barge assembly which will be in a locked, unitary state and will move as if it were an integral one piece unit. At the same time the assembly is so constructed and arranged that the two units can be quickly and easily separated from one another when desired. The tug unit and the barge unit of the present invention when in a separated state are totally and completely seaworthy.

Another aspect of the present invention is the provision of a tug and barge assembly in which the center of gravity of the assembly will be located over the bottom of the barge recess such that when the barge is loaded or ballasted a downward force will be exerted on the barge, thereby insuring a stable and strong total assembly as well as spreading the load over a larger area of contact than would be possible if an upward force were exerted.

A further aspect of the present invention is to provide a tug and barge assembly which can be quickly disconnected at sea and both the tug and boat individually will be found to be seaworthy when separated from one another.

Other and additional objects and advantages will become apparent from the ensuing description taken in conjunction with the accompanying drawings.

Briefly, the objectives of the present invention, in its broadest aspects, are achieved by providing a tugboat unit having a single hull of a particular configuration adapted to be received and retained in a recess provided at the aft end of a barge in firm tight engagement therewith. The tugboat has the forward end of its hull shaped to conform with the configuration of the recess area of the barge and will be supported by the bottom portion of the recess at the aft end of the barge so that a supported, substantially tight mating engagement therebetween will be provided. Positively driven sliding wedge units or like wedging means are positioned between the complementary mating side walls of the barge unit and tug units to insure a tight engagement and to eliminate any relative movement between the tug and barge in any direction. Further, positively driven connecting means are provided between the forward end of the tug and the forward end of the recess area of the barge unit so as to draw the tug and barge tightly together and thus prevent the tug from moving aft relative to the barge. The positively driven connecting means make it possible also to achieve a prompt positive disconnection of the tug and barge unit from one another.

BRIEF DESCRIPTION OF THE DRAWINGS

FIG. 1 is a top plan view of a tug and barge construction made in accordance with the present invention with the respective units of the construction shown in assembled relationship and illustrating the retention of the tug hull unit within the formed recess at the aft end of the barge unit.

FIG. 2 is a side elevation of the tug and barge assembly shown in FIG. 1 and particularly illustrates the supporting of the forward end of the tug hull by the aft portion of the barge.

FIG. 3 is an enlarged fragmentary half top plan view of one side of the tug and barge assembly shown in FIG. 1 illustrating the wedging action between the tug hull and barge by means of a wedge mechanism at one end and further illustrating the tug hull and barge engagement in supported relationship at the opposite end thereof.

FIG. 4 is an enlarged fragmentary side elevation of the tug and barge assembly shown in FIG. 1 and particularly illustrating the interfitting of the tug hull in the barge recess.

FIG. 5 is an enlarged fragmentary cross-sectional view taken on lines 5—5 of FIG. 3 particularly illustrating the supporting engagement of the tug and barge at the forward end of the tug hull.

FIG. 6 is an enlarged half cross-sectional view taken on lines 6—6 of FIG. 4 illustrating the interfitting of the tug and barg units adjacent the aft end of the barge wherein assembled relationship.

FIG. 7 is an enlarged fragmentary top plan view in cross-section of a wedging assembly made in accordance with the present invention illustrating the positioning of the wedge between the barge and tug hull to achieve the desired wedging of the two units.

FIG. 8 is an enlarged fragmentary view taken on lines 8—8 of FIG. 7 illustrating one end of the wedge assembly and its relative position between the barge and tug hull when the wedge assembly is in a fully wedged state.

FIG. 9 is an enlarged fragmentary view taken on line 9—9 of FIG. 7 and illustrating the wedge assembly in a fully wedged state when seen from the opposite end of the view shown in FIG. 8.

DETAILED DISCUSSION OF THE PREFERRED EMBODIMENT

Referring now to the drawings and with particular reference to FIGS. 1-6, a tugboat, generally designated by reference letter T, and a barge, generally designated by reference letter B, are shown in interfitted and connected relationship in the manner that the tug and barge assembly will appear when in an operating state. The tugboat T, as illustrated, possesses a generally conventional configuration and construction of a generally standard design and construction except as modified hereinafter. The cargo carrier or barge B will likewise be of a generally conventional design insofar as the cargo area is concerned. The aft end of the cargo unit will be modified in the manner indicated hereinafter. The barge B to be associated with the tugboat T is shown in the drawings in the form of an oil tanker but it is to be clearly understood this is for purposes of illustration only. The cargo carrying unit to be connected to the tugboat in accordance with the present invention may be any vessel capable of carrying freight, cargo or the like so long as the aft portion of the cargo carrying unit is constructed in accordance with the present invention.

The barge B has a hull 10 that is of a standard configuration and design and may be made of any suitable material, such as, for example, metal. The aft end of the hull 10 of the barge B has a horizontally disposed bottom shelf or support member 11 extending forwardly into the interior of barge B. The bottom support member 11 will extend forwardly in a slight upwardly inclined plane to aid in properly associating the tug T with the barge B in a manner and for a purpose to be more fully described hereinafter. The width of the bottom support member 11 will generally correspond to the width of the tug T and will possess a configuration substantially identical with that of the tug T. The length fore and aft of the support member 11 will be sufficient to receive and support a major portion of the keel or bottom of the tug T in interfitted relationship, as will be more fully explained hereinafter.

As is shown particularly in FIG. 6, each side edge of the bottom support member 11 is provided with an upwardly and outwardly inclined lower sidewall 12 and 13, respectively. The top end of each of the lower sidewalls 12 and 13 is provided with a vertically disposed upper sidewall designated by reference numerals 14 and 15, respectively, and which extend upwardly to the deck line 16 of the barge B. Lower sidewall 12 and its upper side 14 and lower sidewall 13 and its corresponding upper sidewall 15 each curves forwardly and inwardly in a vertical plane from the rear of the barge B and unite with one another along a vertical jointure line or bow 17.

This construction just described results in the formation of a recess area in the aft end of the barge B into which a major portion of the hull of the tugboat T will be interfitted in tight engagement. As a result thereof the configuration, contour and dimensions of the formed recess area in the barge B will correspond to the contour, configuration, and dimensions of the hull of the tugboat T. However, it is to be noted that the sidewalls of the formed recess area of the barge B will not rest absolutely flush against the sidewalls of the tug hull in a press fit relationship, although the bottom of the tug T will rest positively against the bottom support member 11 of the barge B. The reason for lack of absolutely flush contact between the respective sidewalls is to prevent metal to metal engagement along such a large surface which could result in problems of metal chafing, binding and deformation, resulting in possible damage to the units. Moreover, by having the sidewalls of the formed recess of the barge just oversized, easy entrance of the tug into the recess area of the barge can be accomplished. Moreover, this arrangement will allow for manufacturing tolerances of the tug and barge. However, it is to be clearly understood that, if desired, non-metallic sheathing may be provided on one or both of the engaging surfaces to permit tighter and more flush engagement between the mating surfaces. Such sheathing may be in the form of wood, rubber, or resilient plastic material. In this manner it will be possible to secure a somewhat tighter inter-surface sidewall engagement between the tug and the barge without actual metal to metal contact.

To aid in the wedging of the hull of the tug T into the formed recess of the barge B in a vertical direction, an interfitting shoulder to shoulder arrangement between the bow of the tug T and the forward end of recess of the barge B is provided. This association is shown in particular detail in FIG. 5. As illustrated therein, the upper sidewalls 14 and 15, respectively, beginning from the jointure line or bow 17 of the recess area of the barge B, each has an inwardly extending shoulder member, generally designated by reference numeral 18, formed in the upper area thereof. The shoulder member 18 is shown in FIG. 4 for only one sidewall of the recess in the barge, but it is to be clearly understood that there will be a corresponding shoulder member in the opposite sidewall of the recess area of the barge B.

The shoulder member 18 will extend gradually rearwardly from the jointure line or bow 17 of the recess area of the barge B in each of the upper sidewalls 14 and 15 and will taper rearwardly to a zero width at the point indicated by the reference letter P in FIG. 3. The shoulder member 18 comprises a bottom shelf portion 19 extending outwardly from each of the upper sidewalls 14 and 15, respectively for a distance sufficient to provide an adequate supporting area for a corresponding shoulder provided on the tug T. A vertical wall portion 20 extends upwardly from the shelf portion 19 to the deck line 16 of the barge B. This construction results in an inwardly stepped shoulder portion in the upper edge of each sidewall of the formed recess in the barge B at the forward end thereof which will receive a corresponding outwardly extending shoulder portion carried by the tug hull at the bow end thereof in tight, locking engagement in a manner to be more fully described hereinafter.

The tugboat T is generally of conventional construction and includes a wheel house, crew sleeping and eating quarters, engine room and the like, which have been generally designated by reference letter H. The tugboat T is also provided with a standard propulsion system which is generally designated by reference letter M. The tugboat T will thus be a completely self-contained ship which is capable of travel on the high seas under virtually all conditions.

The tugboat T is provided with a keel or bottom 21 which will have generally the same dimensions and configuration within manufacturing tolerances as the bottom support member 11 of the formed recess in the barge B since the keel 21 will be retained and carried by the support member 11 when the tug and barge are in locked relationship. The tugboat T is provided with a hull 22 which will possess a contour, configuration, and dimension corresponding to the contour, configuration, and dimension of the recess area in the barge B. This will insure a proper interfitting of the tug hull within the sidewalls of the formed recess of the barge, as has been described in detail hereinbefore. It is to be understood that the tug hull may be of any suitable configuration so long as it corresponds to the configuration of the recess area of the barge.

To provide the necessary shoulder member for engagement with the shoulder member 18 of the barge B, the upper end of the bow of tug T is provided with a shoulder member, generally designated by reference numeral 23, which extends outwardly on each side of the hull of the tug at the bow thereof. The shoulder member 23 of the tug T has a vertical face portion 24 extending downwardly from the deck line of the tug T, as best shown in FIG. 5, for a distance corresponding to the height of the vertical wall portion 20 of the barge B. An undercut bottom face portion 25 extends inwardly on each side of the tug hull from the vertical face portion 24 for a distance corresponding to the width of the shelf portion 19 of the barge B. The bottom face portion 25 of the tug T will rest on the shelf portion 19 of the barge B when the units are in assembled relationship.

The shoulder member 23 will extend gradually rearwardly from the bow of the tug T along the top of each side of the hull thereof and will taper rearwardly to a zero width at a point indicated by the reference letter P in FIG. 3. The shoulder member 23 of the tug T may be integrally formed in the tug hull or may be a separate element having an outside contour corresponding to the contour of the shoulder member 18 of the recess area of the barge B. The separate shoulder members could then be secured by bolts or the like (not shown) to each side of the tug hull. It is to be understood that the fore and aft length of the shoulder member 23 of the tug T as well as that of the shoulder member 18 of the barge B may vary, as desired, so long as the selected length for each be the same. The fore and aft length selected should be sufficient to give a firm wedging action of the tug and barge in a vertical direction when in a locked state.

It will be found necessary to provide a locking of the tug and barge with one another when in a connected state to prevent any relative fore and aft movement therebetween. To accomplish this, a connecting member is centrally mounted on the deck of the barge B at the aft end thereof and is operatively associated with a complementary connecting assembly on the deck of the tug T at the bow end thereof. Such connecting assembly in addition to locking the tug and barge against fore and aft movement will also serve to draw the tug and barge together in tight relation when secured together, and will also function as the means to force the tug aft relative to the barge when the units are to be disconnected.

In the illustrative embodiment of the connecting assembly, an internally threaded rotatable nut 26 is centrally mounted on the top deck surface of the tug adjacent the bow thereof and is adapted to receive one end of a screw member 27. The other end of the screw member 27 is detachably connected to a mounting member 28 firmly attached to the aft end of the deck of the barge B at the formed recess area thereof. The rotatable nut 26 may be motor driven by a motor (not shown) or may be mechanically rotated by a crank or other device (not shown). With this assembly, a rotation of the nut 26 will cause the screw member 27 to move aft, causing the tug T to be positively drawn to the barge. A reverse rotation of the nut 26 will positively force the tug away from the barge.

It is to be clearly understood that the connecting assembly just described is illustrative in character only and represents but one of several types of connecting means readily available that may be employed to retain the tug and barge in tight fore-aft relationship thereby preventing any relative movement therebetween.

In order to also insure that no relative transverse or vertical movement will occur between the tugboat and barge, a movable wedge mechanism W is to be interposed between the engaging hull portions of the tug and barge. This wedge mechanism is necessitated since an absolutely perfect fitting of the tapered sides of the tug within the recess area formed in the barge cannot be obtained because of manufacturing limitations. As a consequence thereof, a means for providing a locked relationship between the engaging surfaces of the tug hull and the sidewalls of the formed recess in the barge must be provided since relative movement of the tug and barge at sea cannot be tolerated. In general, such wedge mechanism will be actuated by suitable power means, such as, for example, an electric motor thereby insuring a tight, positive wedging relationship. This wedge mechanism, when in a fully extended locking state, will prevent any vertical and transverse movement of the tugboat with respect to the barge.

For an illustrative embodiment of an exemplary and preferred form of a movable wedge mechanism assembly, generally designated by reference letter W, reference is to be had to FIGS. 1, 3, and 7–9 wherein such mechanism and its mode of operation is shown in detail. As depicted in FIg. 1, a single wedge assembly is shown on each side of the tug and barge unit, but it is to be noted that two or more of such wedge assemblies per side, as may be needed or required, can be employed. In the ensuing detailed description of the wedge mechanism W reference will be had only to one such wedge mechanism interposed on one side between the tug hull and the barge recess. However, it is to be clearly understood that a like wedge mechanism will be positioned on the opposite side and the description for one will suffice for the other.

As illustrated, the upper side wall 14 of the recess of the barge B adjacent the aft end of the formed recess in the barge B is provided with a longitudinally extending recess or channel 30 which is tapered fore and aft, with the greater depth being at the forward end thereof. A recess or channel 30, triangular in cross-sectional configuration and complementary with the recess or channel 29 in the hull of the tug T, is longitudinally positioned in the upper wall of the hull of the tug T of the barge B. This recess or channel 29 is not tapered, being of constant cross-section throughout its length.

A wedging member 31, which is generally trapezoidal shaped in cross-section and tapered longitudinally, is positioned within the recess or channel 29 with the triangular portion of the wedge member 31 seated in the recess or channel 30 formed by the upper wall 14 of the recess formed on the barge B. To effect the movement of the wedging member 31, an operating shaft 32 is connected at one end to the wedge member 31, with the opposite end of the shaft 32 connected to a suitable prime mover (not shown).

To effect the desired wedging of the wedge mechanism W between the tug T and the barge B, the prime mover will force the wedging member 31 to move in the complementary channels or recesses 29 and 30 of the barge and tug, respectively. When the operating shaft 32 is extended to its outermost position the wedging member 31 will be disposed firmly between the mating channel areas 29 and 30 of the barge and tug and will effect a final fixation of the tug T and the barge B to one another. The wedging mechanism W in association with the other locking members hereinbefore described will eliminate any possible relative movement between the tug T and barge B in any direction and the two assemblies in this locked state will move as a single integral unit.

In the operation of the form of the invention shown in FIGS. 1–9, the tug T will be driven forwardly toward the formed recess at the aft end of the barge B until the bottom of the hull of the tug T engages the bottom support member 11 of the barge B and moves forwardly therealong. The tug T will then be driven forwardly into the formed recess of the barge B with the hull of the tug T engaging the bottom support member 11 and interfitting into the sidewalls of the formed recess of the barge B. The propulsion of the tug T into the recess of the barge B is continued until the bottom face portion 25 of the shoulder member 23 formed on either side of the hull of the tug T at the bow thereof engages the bottom shelf portions 19 of each of the shoulder members 18 present in the forward end of the upper faces 14 and 15 of the recess formed in the barge. The hull of the tug T then will be propelled forwardly until the bow thereof fully engages the jointure line 17 of the recess area of the barge B.

To lock the tug T into tight engagement with barge B, the locking mechanism is put in operation. To accomplish this, the screw member 27 which is positioned in the rotatable nut 26 carried by the tug T at the forward end thereof is connected to the mounting member 28 of the barge B. The rotatable nut is thereafter rotated on the screw member 27 until the tug T and barge B are drawn together tightly and locked in an absolutely tight fore and aft relationship with one another. This results in an absolute locking of the tug and barge in a fore and aft direction.

To place the wedging in operation after the tug and barge units are so secured, the wedge member 31 of each wedge mechanism W, whether they be two or more per side, is driven in an aftward direction by means of the operating shafts 32. This causes the wedge members 31 to move rearwardly into the respective recesses or channels 29 and 30 of the barge and tug units until each of the wedge members 31 is in its outermost and locked position. The tug T and barge B are now in an absolutely locked relationship with respect to one another. This insures that no vertical movement of the tug relative to the barge is possible and at the same time no lateral movement relative to the tug and barge can be accomplished. Similarly, there can be no longitudinal movement between the members. Thus, when in an assembled and locked state as just described, the barge B and tug T will move as a single integral and unitary member.

In the release or separation of the tug T from the barge B, the prime movers driving the operating shafts 32 of the wedge mechanism W are first started in a reverse direction. This movement results in the wedge members 30 being drawn forwardly toward the bow of the tug T causing an unwedging of the tug T and the barge B from one another. The rotatable nut 26 of locking or latching mechanism is next set into a reverse rotation and this operation is continued until the wedging action between the hull of the tug T and the recess area of the barge is completely released. The screw member 27 is then disconnected from the barge mounting member 28. To complete the separation of the tug T from the barge B, the tug engines are reversed causing the tug to move aft with respect to the barge B, thus withdrawing the tug hull from the recess area of the barge. The movement of the tug T is continued rearwardly until the keel thereof disengages from the bottom support member 11 of the recess area of the barge B. This separation of the tug from the barge can be effected very rapidly by reason of this construction, an accomplishment which is highly desirable, particularly in the case of accidents and the like. Conversely, the tug T and barge B can be coupled to one another in a locked engagement quite easily, which is highly desirable from a standpoint of time.

As has been noted hereinbefore, the hull of the tug T is positioned in and supported by the recess formed in the aft end of the barge. The extent of the positioning of the tug hull within the recess is important to insure proper positioning of the center of gravity of the tug with relation to the barge. In general, the positioning of the tug hull in the recess will be such that the location of the center of gravity of the tug will be over the bottom support member 11 of the recess in the barge B. When this is accomplished, the tug and barge, in an assembled and locked state, will be capable of easy and efficient movement at sea.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. An integrated seagoing vessel comprising a cargo carrying unit, said cargo carrying unit having a recess area in the aft end thereof, a single hull tugboat seated within and supported by said recess area of said cargo carrying unit, the hull of said tugboat unit generally corresponding to the configuration of said recess area, said recess area having a bottom support member and inclined sidewalls, with said support member and said sidewalls contoured forwardly with said sidewalls converging at a jointure line, support means positioned at the forward end of said recess area of said cargo carrying unit, said support means including a recess portion extending rearwardly from the jointure line at the top thereof along each sidewall, with each recess portion merging to a zero width aft of said jointure line, shoulder means carried by said tugboat unit at the forward end of the hull thereof, said shoulder means being complementary with and supported by said support means, said shoulder means including a shoulder portion extending rearwardly from the bow of the tugboat at the top thereof along each side of the hull thereof with each shoulder portion having the same dimensions as each of said recess portions of said cargo carrying unit and being in interfitted relationship therewith, wedging means positioned between and engaging complementary portions of the hull of said tugboat unit and the sidewalls of the recess area of said cargo carrying unit adjacent the aft end of said tugboat unit, said wedging means including means longitudinally movable between the mating portions of the tugboat and the barge unit to positively lock the cargo carrying unit and the tugboat in a unitary state and to prevent relative transverse or vertical movement therebetween, and means for locking said tugboat unit and said cargo carrying unit to one another to prevent relative longitudinal movement therebetween, said tugboat unit and said cargo carrying unit being readily disengageable from one another.

2. An integrated seagoing vessel in accordance with claim 1, wherein the sidewalls of the recess area of the cargo carrying unit and the forward end of the hull of the tugboat unit have curvatures complementary with one another to insure tight, substantially flush engagement therebetween.

3. A seagoing vessel in accordance with claim 1, wherein each sidewall of said recess area of said cargo carrying unit adjacent the aft end thereof is provided with at least a first longitudinally extending channel, the hull of said tugboat unit on each side thereof being provided with at least a second longitudinally extending channel complementary with said first channel member of said recess area, a wedging member longitudinally movable within each pair of said complementary first and second channel members, and means operatively connected to each of said wedging members to move same longitudinally in said channel members.

4. A seagoing vessel in accordance with claim 1, wherein said locking means includes a first locking assembly mounted on the top surface of said tugboat adjacent its forward end, a second locking assembly complementary to and operable with said first locking assembly mounted on the top surface of said barge unit adjacent the aft end thereof, and means to drive said first and second locking assemblies into and out of engagement with one another.

5. An integrated seagoing vessel comprising a cargo carrying unit, said cargo carrying unit having a recess area in the aft end thereof, a single hull tugboat seated within and supported by said recess area of said cargo carrying unit, the hull of said tugboat unit generally corresponding to the configuration of said recess area, said recess area having a bottom support member and inclined side walls, with said support member and said sidewalls contoured forwardly with said sidewalls converging at the jointure line, support means positioned at the forward end of said recess area of said cargo carrying unit, said support means including a recess portion extending rearwardly from the jointure line at the top thereof along each sidewall, with each recess portion merging to a zero width aft of said jointure line, shoulder means carried by said tugboat unit at the forward end of the hull thereof, said shoulder means being complementary with and supported by said support means, said shoulder means including a shoulder portion extending rearwardly from the bow of the tugboat at the top thereof along each side of the hull thereof with each shoulder portion having the same dimensions as each of said recess portions of said cargo carrying unit and being in interfitted relationship therewith, the hull of said tugboat unit on each side thereof being provided with at least a first longitudinally extending channel, each of said first channels being tapered fore and aft with the greater depth being at the forward end thereof, each sidewall of said recess area of said cargo carrying unit adjacent the aft end thereof being provided with at least a second longitudinally extending channel complementary with said first channel member of said tugboat unit, each of said second channels being triangular in cross-section and having a constant cross-section throughout its length, a wedging member longitudinally movable within each pair of said complementary first and second channel members, said wedging members being generally trapezoidal shaped in cross-section and tapered longitudinally, the triangular portion of each of said wedging members being seated in the corresponding triangular shaped recess, and means operatively connected to each of said wedging members to move same longitudinally in said channel members, said wedging members locking the cargo carrying unit and the tugboat in a unitary state to prevent relative transverse or vertical movement therebetween, and means for locking said tugboat unit and said cargo carrying unit to one another to prevent relative longitudinal movement therebetween, said tugboat unit and said cargo carrying unit being readily disengageable from one another.

* * * * *